(12) United States Patent
Cui et al.

(10) Patent No.: US 12,044,112 B2
(45) Date of Patent: Jul. 23, 2024

(54) HIGH AND LOW PRESSURE MANIFOLD LIQUID SUPPLY SYSTEM FOR FRACTURING UNITS

(71) Applicant: YANTAI JEREH PETROLEUM EQUIPMENT & TECHNOLOGIES CO., LTD., Shandong (CN)

(72) Inventors: Shuzhen Cui, Shandong (CN); Yibo Jiang, Shandong (CN); Chunqiang Lan, Shandong (CN); Kun Zhang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 18/153,126

(22) Filed: Jan. 11, 2023

(65) Prior Publication Data

US 2023/0160289 A1    May 25, 2023

Related U.S. Application Data

(63) Continuation of application No. 17/205,388, filed on Mar. 18, 2021, now Pat. No. 11,555,390.

(30) Foreign Application Priority Data

Jan. 18, 2021    (CN) .......................... 202120125688.1

(51) Int. Cl.
*E21B 43/26* (2006.01)
*F16K 31/122* (2006.01)

(52) U.S. Cl.
CPC .......... *E21B 43/26* (2013.01); *E21B 43/2607* (2020.05); *F16K 31/122* (2013.01)

(58) Field of Classification Search
CPC .... E21B 43/26; E21B 43/2607; F16K 31/122; F16K 27/003
See application file for complete search history.

(56) References Cited

U.S. PATENT DOCUMENTS

2016/0326854 A1   11/2016   Broussard et al.
2017/0074074 A1   3/2017   Joseph et al.
(Continued)

FOREIGN PATENT DOCUMENTS

CN    104302958 A    1/2015
CN    110513097 A    11/2019
(Continued)

OTHER PUBLICATIONS

International Search Report dated Sep. 28, 2021 for International Application No. PCT/CN2021/072539, 5 pages.

*Primary Examiner* — James G Sayre
(74) *Attorney, Agent, or Firm* — Crowell & Moring LLP

(57) ABSTRACT

The present disclosure relates to a high and low pressure manifold fluid supply system for fracturing units, including: a trailer, a high and low pressure manifold arranged on the trailer, a support frame arranged on a platform of the trailer, and a power distribution switch cabinet arranged on the support frame, which is configured to be electrically connected to the electrically-driven fracturing units and configured to distribute electricity to the electrically-driven fracturing units. Through the high and low pressure manifold fluid supply system integrated with electricity supply facilities therein according to the present disclosure, the electrically-driven fracturing units are powered, in this way, the electricity supply and distribution system in the well site can be effectively simplified, the connection distance of the cables can be shorten, and further the time spent on connection can be saved, thereby improving the well site layout efficiency.

20 Claims, 3 Drawing Sheets

(56) References Cited

U.S. PATENT DOCUMENTS

| | | | |
|---|---|---|---|
| 2018/0284817 A1 | 10/2018 | Cook et al. | |
| 2019/0211814 A1* | 7/2019 | Weightman | ............. F04B 47/00 |
| 2020/0040705 A1 | 2/2020 | Morris | |
| 2020/0109617 A1 | 4/2020 | Oehring | |

FOREIGN PATENT DOCUMENTS

| | | | | |
|---|---|---|---|---|
| CN | 110821464 A | 2/2020 | | |
| WO | WO 2021/003178 A1 | 1/2021 | | |
| WO | WO-2021003178 A1 * | 1/2021 | ......... | E21B 43/2607 |

* cited by examiner

HIGH AND LOW PRESSURE MANIFOLD LIQUID SUPPLY SYSTEM FOR FRACTURING UNITS

CROSS REFERENCE

The present application is a continuation application of and claims the benefit of priority to U.S. patent application Ser. No. 17/205,388 filed on Mar. 18, 2021 and titled "HIGH AND LOW PRESSURE MANIFOLD LIQUID SUPPLY SYSTEM FOR FRACTURING UNITS," the entirety of which is herein incorporated by reference.

TECHNICAL FIELD

The present disclosure relates to the technical field of oil and gas field fracturing, more specifically, to a high and lower pressure manifold liquid supply system for fracturing units

BACKGROUND

In a fracturing operation site of oil and gas field, a power supply and transmission system of a traditional fracturing unit typically includes: a diesel engine as a power source, a fracturing plunger pump as an actuator, and a gearbox as well as a transmission shaft connected therebetween for transmitting power. However, the diesel engine as the power source has disadvantages of, for example, low power, large volume, high fuel costs, as well as waste gas pollution and noise pollution. Apart from this, the well site layout using the diesel engine as the power source occupies a large area. Therefore, the use of electric motors instead of diesel engines as well as transmissions thereof for directly driving fracturing units has gradually become a new trend in development which has gradually been spotted in practical applications. When electrically-driven fracturing units are employed, there arise new problems, such as complicated connection of the electricity distribution system at the well site, a long connection distance, a time-consuming connection process, and the like. In addition, since electrical interfaces of the electrically-driven fracturing units are arranged at the head portions of the electrically-driven fracturing trailers for carrying the electrically-driven fracturing units while the fracturing fluid connection interfaces of the electrically-driven fracturing units are arranged at the rear portions of the electrically-driven fracturing trailers, therefore causing hindrances for moving the electrically-driven fracturing trailers.

FIG. 1 illustrates a diagram of a well site layout according to the prior art, where a power supply system 1 is typically located at a position distant away from electrically-driven fracturing trailers and electrically connected to electrical interfaces in a vicinity of head portions (i.e., the left side in FIG. 1) of the electrically-driven fracturing trailers via multiple long cables to supply electricity to electrically-driven fracturing units 2, low pressure fracturing fluid provided by electrically-driven sand mixing units 3 on electrically-driven sand mixing trailers are delivered via a high and low pressure manifold 4 to fluid interfaces in a vicinity of rear portions (i.e., the right side in FIG. 1) of the electrically-driven fracturing trailers, and the electrically-driven fracturing units 2 pressurize low pressure fracturing fluid into high pressure fracturing fluid and deliver high pressure fracturing fluid back to the high and low pressure manifold 4 and further to a wellhead 5 via the high and low pressure manifold 4. Given the fact that each electrically-driven fracturing unit 2 needs to be separately electrically connected to the power supply system 1, a large number of cables are required in such arrangement. Moreover, for the electrically-driven fracturing units 2, connection interfaces are provided in the vicinity of both the head and rear portions of the trailers, thus resulting in complicated connection and causing hindrances for moving the electrically-driven fracturing trailers.

As a result, there is a need for improving the electricity supply and distribution system of the well site to at least partly solve the foregoing problems.

SUMMARY

The objective of the present disclosure is to provide a high and low pressure manifold liquid supply system for fracturing units, which can simplify the electricity distribution layout, save the well site space, and facilitate operations.

According to an aspect of the present disclosure, the high and lower pressure manifold liquid supply system comprises:
a trailer comprising a platform;
a high and low pressure manifold arranged on the platform and configured to deliver low pressure fracturing fluid from one or more sand mixing units to a plurality of electrically-driven fracturing units and to receive high pressure fracturing fluid from the plurality of electrically-driven fracturing units;
a support frame arranged on the platform; and
a distribution switch cabinet fixed on the support frame and configured to distribute electricity to the plurality of electrically-driven fracturing units.

According to the present disclosure, the generator set is only required to be connected to the distribution switch cabinet of the high and low pressure manifold liquid supply system, without the necessity of separately connecting to each electrically-driven fracturing unit. In this way, the amount of cables required for connecting the electrically-driven fracturing units can be significantly reduced, thus simplifying the connection complexity of the electrically-driven fracturing units.

In an embodiment, the high and low pressure manifold comprises:
a low pressure manifold comprising one or more low pressure inlets in fluid communication with the one or more sand mixing units to receive the low pressure fracturing fluid from the one or more sand mixing units, and a plurality of low pressure outlets in fluid communication with the plurality of electrically-driven fracturing units to deliver the low pressure fracturing fluid to the plurality of electrically-driven fracturing units;
a high pressure manifold comprising a plurality of high pressure inlets in fluid communication with the plurality of electrically-driven fracturing units to receive the high pressure fracturing fluid from the plurality of electrically-driven fracturing units, and one or more high pressure outlets in fluid communication with a wellhead to deliver the high pressure fracturing fluid to the wellhead.

According to the present disclosure, the high and low pressure manifold liquid supply system can simultaneously perform the functions of delivering fracturing fluid and supplying electricity.

In an embodiment, the plurality of low pressure outlets are arranged at both lateral sides of the high and low pressure manifold, and the plurality of high pressure inlets are arranged at both lateral sides of the high and low pressure manifold.

According to the present disclosure, the high and low pressure manifold at both lateral sides can be connected to the electrically-driven fracturing units, thereby increasing the number of the electrically-driven fracturing units and improving the operation efficiency.

In an embodiment, the distribution switch cabinet comprises:
- a power input interface configured to be electrically connected to a generator set to receive power supplied by the generator set;
- a plurality of electrical junction boxes configured to be electrically connected to the plurality of electrically-driven fracturing units, respectively, to deliver the power to the plurality of electrically-driven fracturing units; and
- a plurality of distribution switches configured to distribute electricity to the plurality of electrically-driven fracturing units.

According to the present disclosure, the high and low pressure manifold can perform an electricity distribution function for the plurality of electrically-driven fracturing units when delivering fracturing fluid.

In an embodiment, the high and low pressure manifold liquid supply system further comprises:
- a plurality of prefabricated low flow-pressure cables and a plurality of prefabricated high flow-pressure cables, for electrically connecting the distribution switch cabinet with the plurality of electrically-driven fracturing units.

According to the present disclosure, the plurality of electrically-driven fracturing units can be directly electrically connected to the high and low pressure manifold, without the necessity of connecting to the generator set distant away, thereby reducing the number of connection cables.

In an embodiment, the low flow-pressure cables are arranged adjacent to a low pressure fluid pipeline connected between the plurality of low pressure outlets and the electrically-driven fracturing units and fixed on the low pressure fluid pipeline, and the high flow-pressure cables are arranged adjacent to a high pressure fluid pipeline connected between the plurality of high pressure inlets and the electrically-driven fracturing units and fixed on the high pressure fluid pipeline.

According to the present disclosure, the cables are arranged adjacent to the fluid pipelines connected between the electrically-driven fracturing units and the high and low pressure manifold, to render the high and low pressure manifold liquid supply system more compact.

In an embodiment, the sand mixing units are electrically-driven sand mixing units, and the distribution switch cabinet is further configured to distribute electricity to the sand mixing units.

According to the present disclosure, the sand mixing units can be directly electrically connected to the high and low pressure manifold, without the necessity of connecting to the generator set distant away, thereby reducing the number of connection cables.

In an embodiment, the electrical junction boxes are further electrically connected to the sand mixing units, and the distribution switches are further configured to distribute electricity to the sand mixing units.

According to the present disclosure, the high and low pressure manifold can perform an electricity distribution function for the sand mixing units when delivering fracturing fluid.

In an embodiment, the electrically-driven fracturing units are arranged on electrically-driven fracturing trailers, and the low pressure manifold and the high pressure manifold are in fluid communication with fluid inlets and outlets of the electrically-driven fracturing units located in a vicinity of rear portions of the electrically-driven fracturing trailers via the low pressure fluid pipeline and the high pressure fluid pipeline respectively.

In the embodiment, the low flow-pressure cables and the high flow-pressure cables are electrically connected to electrical interfaces of the electrically-driven fracturing units located in the vicinity of the rear portions of the electrically-driven fracturing trailers, respectively.

According to the present disclosure, the electrical interfaces of the electrically-driven fracturing units and the fluid inlets and outlets are all located in the vicinity of rear portions of the electrically-driven fracturing trailers, thereby simplifying the connection process, without causing hindrances for moving the electrically-driven trailers.

In an embodiment, the generator set is a gas turbine generator set, and a fuel consumed by the gas turbine generator set may be a compressed natural gas (CNG) or a liquefied natural gas (LNG).

According to the present disclosure, the electrically-driven fracturing operation in a well site can be more environment-friendly and more efficient.

In an embodiment, the generator set is a gas turbine generator set, and a fuel consumed by the gas turbine generator set is a wellhead gas.

According to the present disclosure, the well site generator set may directly take use of wellhead gas, thereby reducing costs.

BRIEF DESCRIPTION OF THE DRAWINGS

In order to better understand the above and other objectives, features and advantages of the present disclosure, preferred embodiments as shown in the accompanied drawings are provided. Throughout the drawings, the same or similar reference signs refer to the same or similar elements. It would be appreciated by those skilled in the art that the drawings are provided to illustrate the preferred embodiments of the present disclosure, without suggesting any limitation to the scope of the present disclosure, and respective components therein are not drawn to scale.

Figure 1:
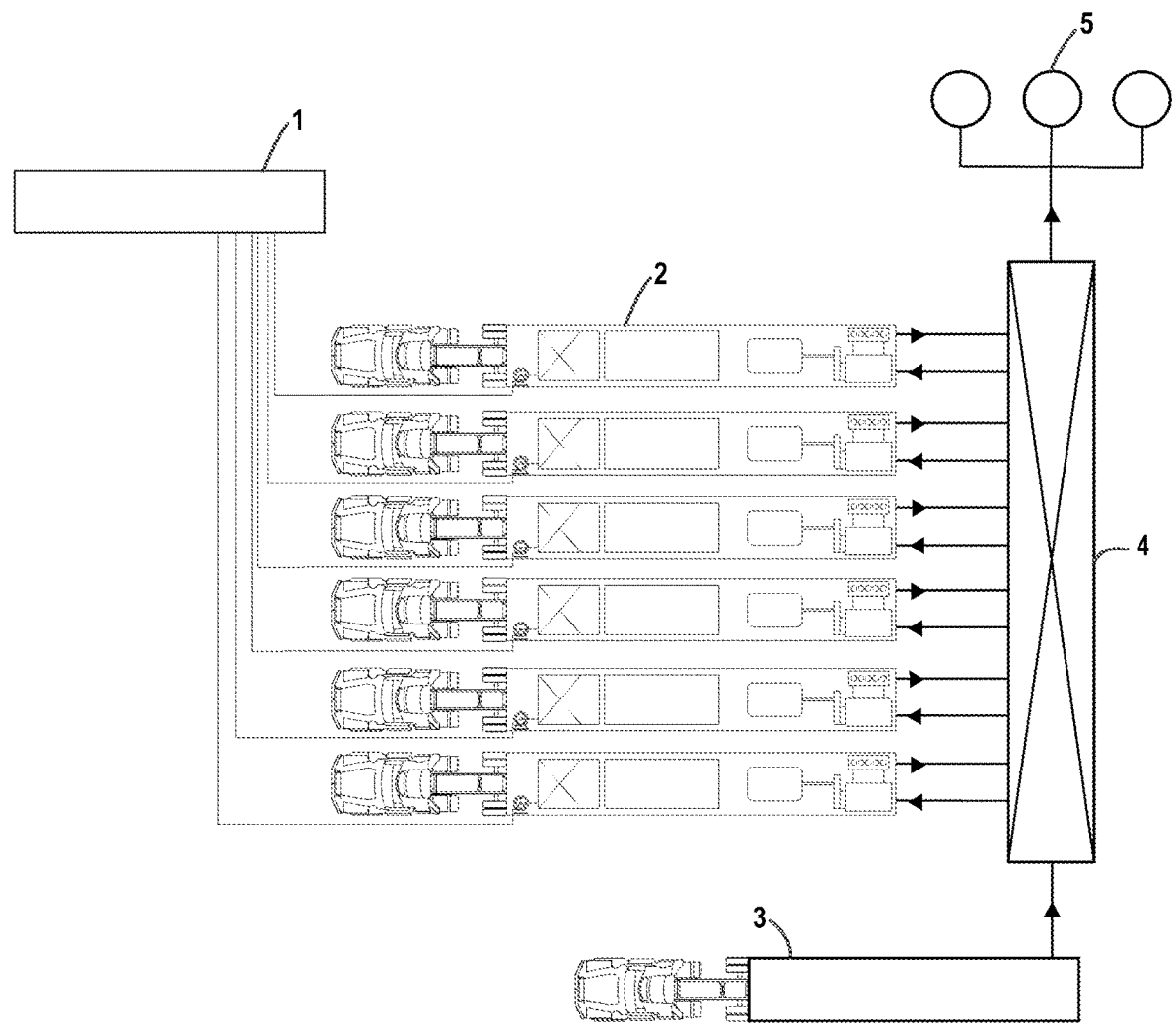
FIG. 1 illustrates a diagram of a well site layout according to the prior art.

REFERENCE SIGNS 1 generator set
2 electrically-driven fracturing unit
3 electrically-driven sand mixing unit
4 high and low pressure manifold
5 wellhead
10 generator set
20 electrically-driven fracturing unit 30 sand mixing unit
40 high and low pressure manifold liquid supply system
41 trailer
42 high and low pressure manifold
421 low pressure manifold
4211 low pressure inlet
4212 low pressure outlet
422 high pressure manifold
4221 high pressure inlet
4222 high pressure outlet
423 low pressure fluid pipeline
424 high pressure fluid pipeline
43 support frame
44 distribution switch cabinet
441 electrical junction box
50 wellhead

DETAILED DESCRIPTION OF EMBODIMENTS

Reference will now be made to the drawings to describe in detail the embodiments of the present disclosure. The description here is only about preferred embodiments of the present disclosure, and those skilled in the art would envision, on the basis of the preferred embodiments described herein, other manners that can implement the present disclosure, which also fall into the scope of the present disclosure.

The present disclosure provides a high and low pressure manifold liquid supply system for fracturing units, which is integrated with power supply facilities. Hereinafter, the high and low pressure manifold liquid supply system according to the present disclosure will be described in detail with reference to the accompanied drawings. The term "liquid" may be alternatively referred to as "fluid".

Figure 2:
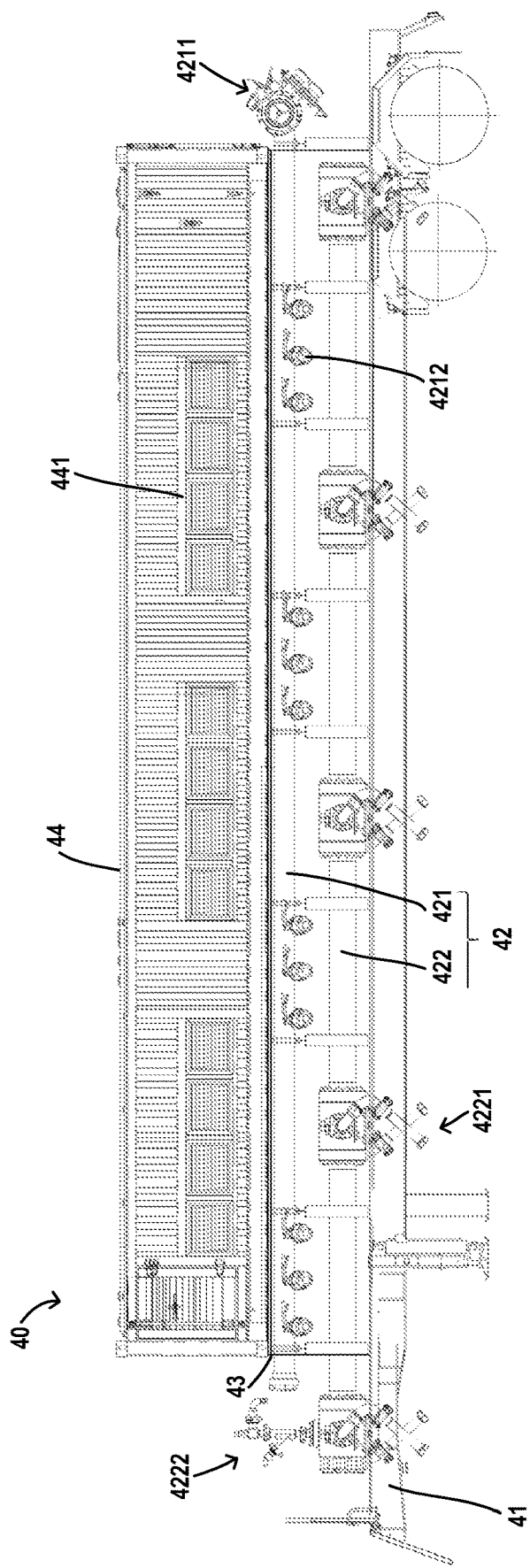
FIG. 2 schematically illustrates a high and low pressure manifold liquid supply system according to the present disclosure.
Figure 3:
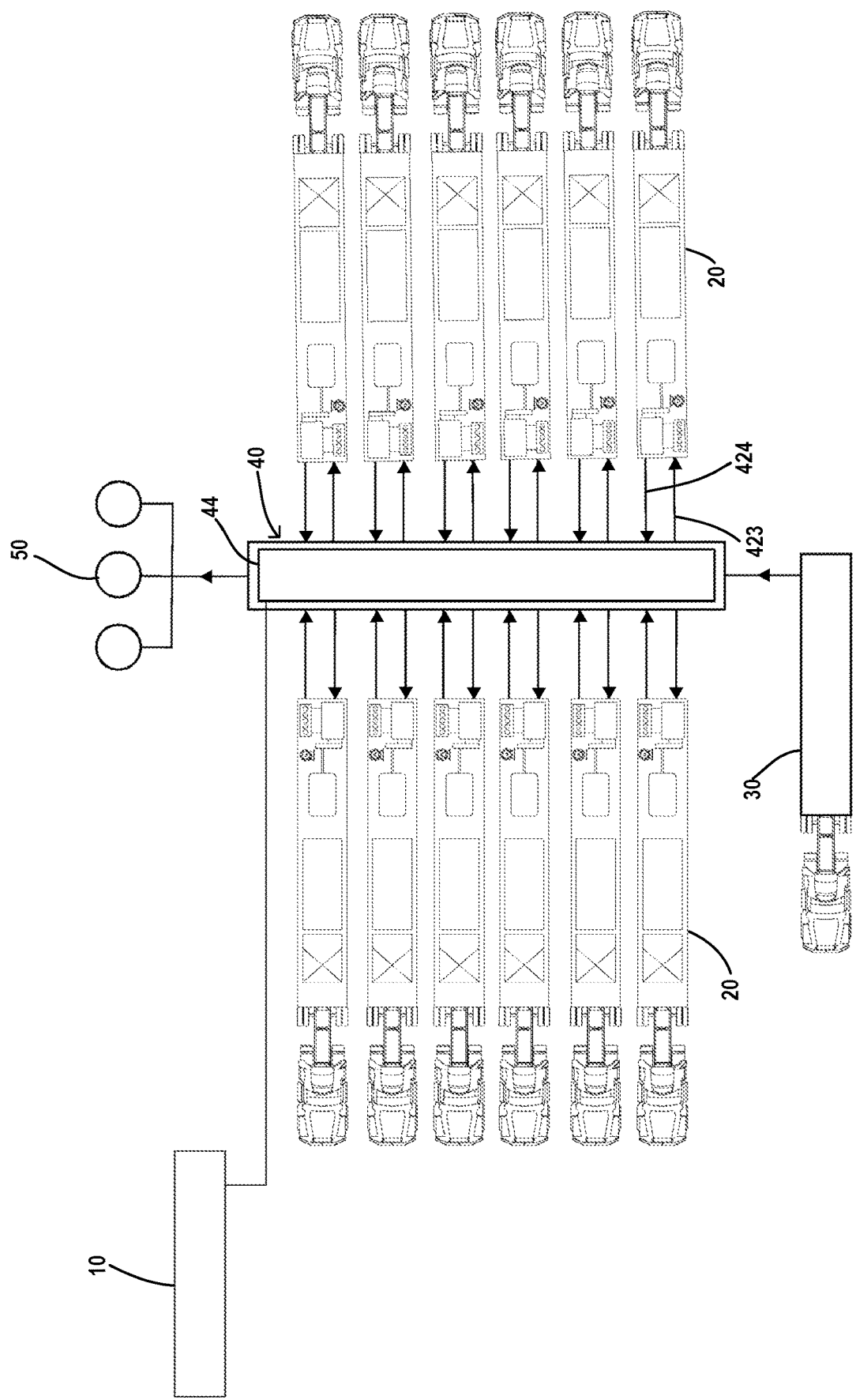
FIG. 3 schematically illustrates a well site layout where a high and low pressure manifold liquid supply system according to the present disclosure is employed.

As shown in FIGS. 2 and 3, the high and low pressure manifold liquid supply system 40 according to the present disclosure includes a trailer 41 having a platform, a high and low pressure manifold 42 arranged on the platform, a support frame 43 arranged on the platform, and distribution switch cabinet 44 arranged on the support frame 43. The upstream of the high and low pressure manifold 42 is in fluid communication with one or more sand mixing units 30 (only one is shown in FIG. 3) to receive low pressure fracturing fluid therefrom, and the downstream of the high and low pressure manifold 42 is in fluid communication with a plurality of electrically-driven fracturing units 20 to deliver the low pressure fracturing fluid to the fracturing units 20. The electrically-driven fracturing units 20 pressurize the low pressure fracturing fluid into high pressure fracturing fluid and then deliver them back to the high and low pressure manifold 42 and further to the wellhead of the oil gas field via the high and low pressure manifold 42, for fracturing operations. In addition, the high and low pressure manifold fluid supply system 40 according to the present disclosure further includes a distribution switch cabinet 44 fixed on the support frame 43 for distributing electricity to the electrically-driven fracturing units 20.

According to a preferred embodiment of the present disclosure, the high and low pressure manifold 42 includes a low pressure manifold 421 for delivering low pressure fracturing fluid and a high pressure manifold 422 for delivering high pressure fracturing fluid. The low pressure manifold 421 is in fluid communication with one or more sand mixing units 30 to receive the low pressure fracturing fluid from the latter, and the low pressure manifold 421 is further in fluid communication with the plurality of electrically-driven fracturing units 20 to deliver the low pressure fracturing fluid to the latter for pressurization. The high pressure manifold 422 is in fluid communication with the plurality of electrically-driven fracturing units 20 to receive high pressure fracturing fluid pressurized by the plurality of electrically-driven fracturing units 20, and collects the high pressure fracturing fluid and delivers them to the wellhead 50 (see FIG. 3).

The low pressure manifold 421 includes one or more low pressure inlets 4211 and a plurality of low pressure outlets 4212, for delivering the low pressure fracturing fluid from the sand mixing units 30 via the low pressure inlets 4211 to the low pressure manifold 421, and then delivering the same via the low pressure outlets 4212 to the electrically-driven fracturing units 20 for pressurization.

The high pressure manifold 422 includes a plurality of high pressure inlets 4221 and one or more high pressure outlets 4222, for delivering the high pressure fracturing fluid pressurized by the electrically driven fracturing units 20 via the high pressure inlets 4221 to the high pressure manifold 422, and then delivering the same via the high pressure outlets 4222 to the wellhead 50.

In a preferred embodiment, the low pressure outlets 4212 of the low pressure manifold and the high pressure inlets 4221 of the high pressure manifold are arranged at both lateral sides of the high and low pressure manifold 42 such that the electrically-driven fracturing units 20 can be connected to the high and low pressure manifold 42 at both lateral sides of the high and low pressure manifold 42.

Further, the low pressure inlets 4211 and the high pressure outlets 4222 are preferably provided at longitudinal ends of the high and low pressure manifold 42 respectively.

According to a preferred embodiment of the present disclosure, the distribution switch cabinet 44 includes a power input interface and a plurality of electrical junction boxes 441, where the power input interface is configured to be electrically connected to the generator set 10 for receiving electricity, and the electrical junction boxes 441 are configured to be electrically connected to the respective electrically-driven fracturing units 20. In addition, the distribution switch cabinet 44 further includes a plurality of distribution switches for performing an electricity distribution operation for the electrically-driven fracturing units 20.

In a preferred embodiment, the high and pressure manifold liquid supply system 40 includes a plurality of prefabricated low flow-pressure cables and a plurality of prefabricated high flow-pressure cables (not shown in figures) to form a current loop between the distribution switch cabinet 44 and the electrically driven fracturing units 20 for delivering the electricity from the distribution switch cabinet 44 to the electrically-driven fracturing units 20. The low flow-pressure cables may refer to electric cables that are used or configured to carry electric power from a lower-voltage electric source (e.g., a 480-volt source), whereas the high flow-pressure cables refer to electric cables that may be used/configured to carry electric power from a higher-voltage electric source (e.g., a voltage that is higher than 480 volts). The low flow-pressure cables and the high flow-pressure cables may be manufactured using different processes resulting in electric cables that can withstand different lower and higher ranges of voltage, respectively. The high flow-pressure cables, for example, may have a different insulating shell/cladding composition and manufacturing process with a higher insulation bread-down voltage. The low flow-pressure cables and high flow-pressure cables, for example may be of a first power grade and a second power grade. The first power grade may be lower than the second power grade. For example, the high flow-pressure cables may be thicker than the low flow-pressure cables in either conductor diameters, insulator walls, or both. In some implementations, the low flow-pressure cables are arranged adjacent to a low pressure fluid pipeline 423 connected between the low pressure outlets 4212 and the electrically-driven fracturing units 20 for delivering the low pressure fracturing fluid to the electrically-driven fracturing units 20, and preferably fixed on the low pressure fluid pipeline 423. The high flow-pressure cables are arranged adjacent to the high pressure fluid pipeline 424 connected between the high pressure inlets 4221 and the electrically-driven fracturing units 20 for delivering the high pressure fracturing fluid to the high pressure manifold 422, and preferably fixed on the high pressure fluid pipeline 424. By prefabricating the high and low flow-pressure electricity supply cables, the connection distance between the units can be reduced, the time spent on connection can be saved, and the well site layout arranging efficiency can be improved. Moreover, the arrangement and movement of the units are free of the influence of the connection cables thus enabling easy detachment from the well site.

In a preferred embodiment, the sand mixing units are electrically-driven sand mixing units, and the distribution switch cabinet 44 can distribute electricity to the sand mixing units 30. In the embodiment, the electrical junction boxes 441 are electrically connected to the sand mixing units 30 via cables which, for example, may be arranged adjacent to the fluid pipeline connected between the electrically-driven sand mixing units 30 and the high and low pressure manifold 42 and fixed thereto. Meanwhile, the distribution switches can perform an electricity distribution operation on the sand mixing units 30.

According to a preferred embodiment of the present disclosure, the electrically-driven fracturing units 20 are arranged on the electrically-driven fracturing trailers, and the low pressure manifold 421 and the high pressure manifold 422 are respectively in fluid communication with the fluid inlets and outlets of the electrically-driven units 20 via the low pressure fluid pipeline 423 and the high pressure fluid pipeline 424, where the fluid inlets and outlets are arranged in vicinity of the rear portions of the electrically-driven fracturing trailers. Moreover, the low flow-pressure cables and the high flow-pressure cables are electrically connected to the electrical interfaces of the electrically-driven fracturing units 20, where the electrical interfaces are also arranged in the vicinity of the rear portions of the electrically-driven fracturing trailers. Such arrangement has the advantage of simplifying the distribution arrangement of the electrically-driven fracturing trailers, thereby simplifying the electrical connection process and reducing hindrances for moving the electrically-driven fracturing trailers.

In a preferred embodiment, the generator set 10 may be a gas turbine generator set, and a fuel consumed by the gas turbine generator set may be a compressed natural gas (CNG), a liquefied natural gas (LNG) or a wellhead gas.

Through the high and low pressure manifold liquid supply system according to the present disclosure, the electrically-driven fracturing units are powered, in this way, the layout of the electricity supply and distribution system of the well site can be effectively simplified, the connection distance of the cables can be shortened, and the time spent on connection can be saved, thereby improving the well site arranging efficiency. In the meantime, since the circuit connections and the fracturing fluid connections are both provided at the rear portions of the electrically-driven fracturing trailers, they will not impact the movement of the electrically-driven fracturing trailers, thus enabling easy detachment from the well site.

The foregoing description on the various embodiments of the present disclosure has been presented to those skilled in the relevant fields for the purpose of illustration, but is not intended to be exhaustive or limited to a single embodiment disclosed herein. As aforementioned, many substitutions and variations will be apparent to those skilled in the art. Therefore, although some alternative embodiments have been described above, those skilled in the art can envision or develop other embodiments according to the present disclosure. The present disclosure is intended to cover all substitutions, modifications and variations of the embodiments described herein, as well as other embodiments falling into the spirits and scope of the present disclosure.

We claim:

1. A fracturing fluid manifold system for serving a plurality of fracturing units, comprising:
   a platform;
   a manifold unit comprising:
      an intaking inlet configured to intake an input fracturing fluid from a fracturing fluid source;
      an operative outlet configured to deliver an output fracturing fluid to a wellhead; and
      a plurality of distribution outlets and a plurality of collection inlets distributed as inlet-outlet pairs between the intaking inlet and the operative outlet and configured to deliver the input fracturing fluid to the plurality of fracturing units via a set of distribution fluid pipelines and to receive pressurized fracturing fluid generated from the input fracturing fluid by the plurality of fracturing units via a set of collection fluid pipelines, respectively;
   a support frame for disposing the manifold unit on the platform;
   an electrical switch cabinet disposed on the support frame and configured to distribute electricity to the plurality of fracturing units; and
   a first plurality of prefabricated electric cables of a first power grade and a second plurality of prefabricated electric cables of a second power grade, the second power grade being higher than the first power grade, the first plurality of prefabricated electric cables being routed along with the distribution fluid pipelines, and the second plurality of prefabricated electric cables being routed along with the collection fluid pipelines.

2. The fracturing fluid manifold system of claim 1, wherein the manifold unit further comprises:
   a distribution manifold comprising the intaking inlet in fluid communication with the fracturing fluid source to receive the input fracturing fluid, and the plurality of distribution outlets in fluid communication with the plurality of fracturing units via the set of distribution fluid pipelines to deliver the input fracturing fluid to the plurality of fracturing units; and
   a collection manifold comprising the plurality of collection inlets in fluid communication with the plurality of fracturing units via the set of collection fluid pipelines to receive the pressurized fracturing fluid from the plurality of fracturing units to form the output fracturing fluid, and the operative outlet in fluid communication with the wellhead to deliver the output fracturing fluid to the wellhead,
   wherein a first pressure of the input fracturing fluid from the fracturing fluid source to the plurality of fracturing units is lower than a second pressure of the pressured fracturing fluid by each of the plurality of fracturing units, which is lower than a third pressure of the output fracturing fluid collected by the collection manifold from the plurality of fracturing units.

3. The fracturing fluid manifold system according to claim 2, wherein both the plurality of distribution outlets and the plurality of collection inlets are arranged on both lateral sides of the manifold unit.

4. The fracturing fluid manifold system according to claim 3, wherein the electrical switch cabinet comprises:
a power input interface configured to receive the electricity from at least one electrical generator;
a plurality of electrical junction boxes configured to be electrically connected to the plurality of fracturing units to deliver the electricity to the plurality of fracturing units; and
a plurality of distribution switches configured to distribute the electricity to the plurality of fracturing units.

5. The fracturing fluid manifold system according to claim 4, wherein:
the fracturing fluid source comprises at least one sand mixing unit which are electrically-driven; and
the electrical switch cabinet is further configured to distribute the electricity to the at least one sand mixing unit.

6. The fracturing fluid manifold system according to claim 5, wherein the electrical junction boxes are further electrically connected to the at least one sand mixing unit, and at least one of the plurality of distribution switches is further configured to distribute the electricity to the at least one sand mixing unit.

7. The fracturing fluid manifold system according to claim 5, wherein the at least one sand mixing unit each includes a wheeled platform.

8. The fracturing fluid manifold system according to claim 4, wherein:
the plurality of fracturing units are arranged on electrically-driven fracturing platforms; and
the distribution manifold as well as the collection manifold are in fluid communication with fluid interfaces of the plurality of fracturing units located in vicinity of rear portions of the electrically-driven fracturing platforms via the set of distribution fluid pipelines and the set of collection fluid pipelines, respectively.

9. The fracturing fluid manifold system according to claim 8, wherein the first plurality of prefabricated electric cables and a second plurality of prefabricated electric cables are electrically connected to electrical interfaces of the plurality of fracturing units located in the vicinity of the rear portions of the electrically-driven fracturing platforms.

10. The fracturing fluid manifold system according to claim 4, wherein the at least one electrical generator comprises a gas turbine electrical generator fueled by compressed natural gas (CNG) or liquefied natural gas (LNG).

11. The fracturing fluid manifold system according to claim 4, wherein the at least one electrical generator comprises a gas turbine electrical generator powered by a gaseous fuel from the wellhead.

12. The fracturing fluid manifold system according to claim 1 configured to simultaneously deliver the input fracturing fluid and the output fracturing fluid, and supply the electricity.

13. The fracturing fluid manifold system according to claim 1, wherein the platform further comprises a set of wheels operatively coupled with the platform, wherein the intaking inlet is disposed above the set of wheels.

14. A fracturing fluid manifold system for serving a plurality of fracturing units, comprising:
a platform;
a manifold unit arranged on the platform and configured to deliver an input fracturing fluid from a fracturing fluid source to the plurality of fracturing units and to deliver an output fracturing fluid to a wellhead;
a support frame for disposing the manifold unit on the platform;
an electrical switch cabinet fixed on the support frame, wherein the electrical switch cabinet comprises a first electrical junction box configured to distribute electricity to the plurality of fracturing units, wherein the first electrical junction box is positioned entirely above the manifold unit; and
a first plurality of prefabricated electric cables of a first power grade and a second plurality of prefabricated electric cables of a second power grade, for electrically connecting the electrical switch cabinet with the plurality of fracturing units, wherein the first plurality of prefabricated electric cables are fixedly arranged adjacent to one or more distribution fluid pipelines for delivering the input fracturing fluid to plurality of fracturing units, and the second plurality of prefabricated electric cables are fixedly arranged adjacent to one or more collection fluid pipeline for receiving pressurized fracturing fluid from the plurality of fracturing units.

15. The fracturing fluid manifold system according to claim 14, wherein the manifold unit further comprises:
an intaking inlet and an operative outlet disposed at opposing longitudinal ends of the manifold unit;
a distribution manifold comprising the intaking inlet in fluid communication with the fracturing fluid source to receive the input fracturing fluid and a plurality of distribution outlets in fluid communication with the plurality of fracturing units via the one or more distribution fluid pipelines to deliver the input fracturing fluid to the plurality of fracturing units; and
a collection manifold comprising the operative outlet in fluid communication with the wellhead to deliver the output fracturing fluid to the wellhead and a plurality of collection inlets in fluid communication with the plurality of fracturing units via the one or more collection fluid pipelines to receive the pressurized fracturing fluid from the plurality of fracturing units,
wherein a first pressure of the input fracturing fluid from the fracturing fluid source to the plurality of fracturing units is lower than a second pressure of the pressurized fracturing fluid by each of the plurality of fracturing units, which is lower than a third pressure of the output fracturing fluid collected by the collection manifold from the plurality of fracturing units.

16. The fracturing fluid manifold system according to claim 14, wherein the electrical switch cabinet comprises a second electrical junction box and a third electrical junction box configured to distribute the electricity to the plurality of fracturing units, wherein the second electrical junction box and the third electrical junction box are disposed entirely above the manifold unit.

17. The fracturing fluid manifold system according to claim 14, wherein the manifold unit comprises an intaking inlet and an operative outlet, wherein the manifold unit is disposed entirely therebetween.

18. A fracturing fluid manifold system for serving a plurality of fracturing units, comprising:
a wheeled platform;

a manifold unit arranged on the wheeled platform and configured to deliver an input fracturing fluid from one or more sand mixing units to the plurality of fracturing units and to deliver an output fracturing fluid to a wellhead;

a support frame arranged on the wheeled platform;

an electrical switch cabinet fixed on the support frame and configured to distribute electricity to the plurality of fracturing units; and a first plurality of prefabricated electric cables of a first power grade and a second plurality of prefabricated electric cables of a second power grade higher than the first power grade, for electrically connecting the electrical switch cabinet with the plurality of fracturing units, wherein the first plurality of prefabricated electric cables are fixedly arranged adjacent to one or more distribution fluid pipelines for delivering the input fracturing fluid to the plurality of fracturing units, and the second plurality of prefabricated electric cables are fixedly arranged adjacent to one or more collection fluid pipeline for receiving pressurized fracturing fluid from the plurality of fracturing units, wherein the one or more sand mixing units are configured to receive the electricity from the electrical switch cabinet and each comprises a platform.

19. The fracturing fluid manifold system according to claim 18, wherein the one or more sand mixing units are directly in direct connection to the manifold unit.

20. The fracturing fluid manifold system according to claim 18, wherein the manifold unit further comprises:

an intaking inlet and an operative outlet disposed at opposing longitudinal ends of the manifold unit;

a distribution manifold comprising the intaking inlet in fluid communication with the one or more sand mixing units to receive the input fracturing fluid and a plurality of distribution outlets in fluid communication with the plurality of fracturing units via the one or more distribution fluid pipelines to deliver the input fracturing fluid to the plurality of fracturing units; and a collection manifold comprising the operative outlet in fluid communication with the wellhead to deliver the output fracturing fluid to the wellhead and a plurality of collection inlets in fluid communication with the plurality of fracturing units via the one or more collection fluid pipelines to receive the pressurized fracturing fluid from the plurality of fracturing units, wherein a first pressure of the input fracturing fluid from the one or more sand mixing units to the plurality of fracturing units is lower than a second pressure of the pressurized fracturing fluid by each of the plurality of fracturing units, which is lower than a third pressure of the output fracturing fluid collected by the collection manifold from the plurality of fracturing units.

* * * * *